C. J. E. WAXBOM.
ELECTRIC LOCOMOTIVE.
APPLICATION FILED JAN. 22, 1912. RENEWED APR. 28, 1914.
1,120,572.
Patented Dec. 8, 1914.
3 SHEETS—SHEET 2.
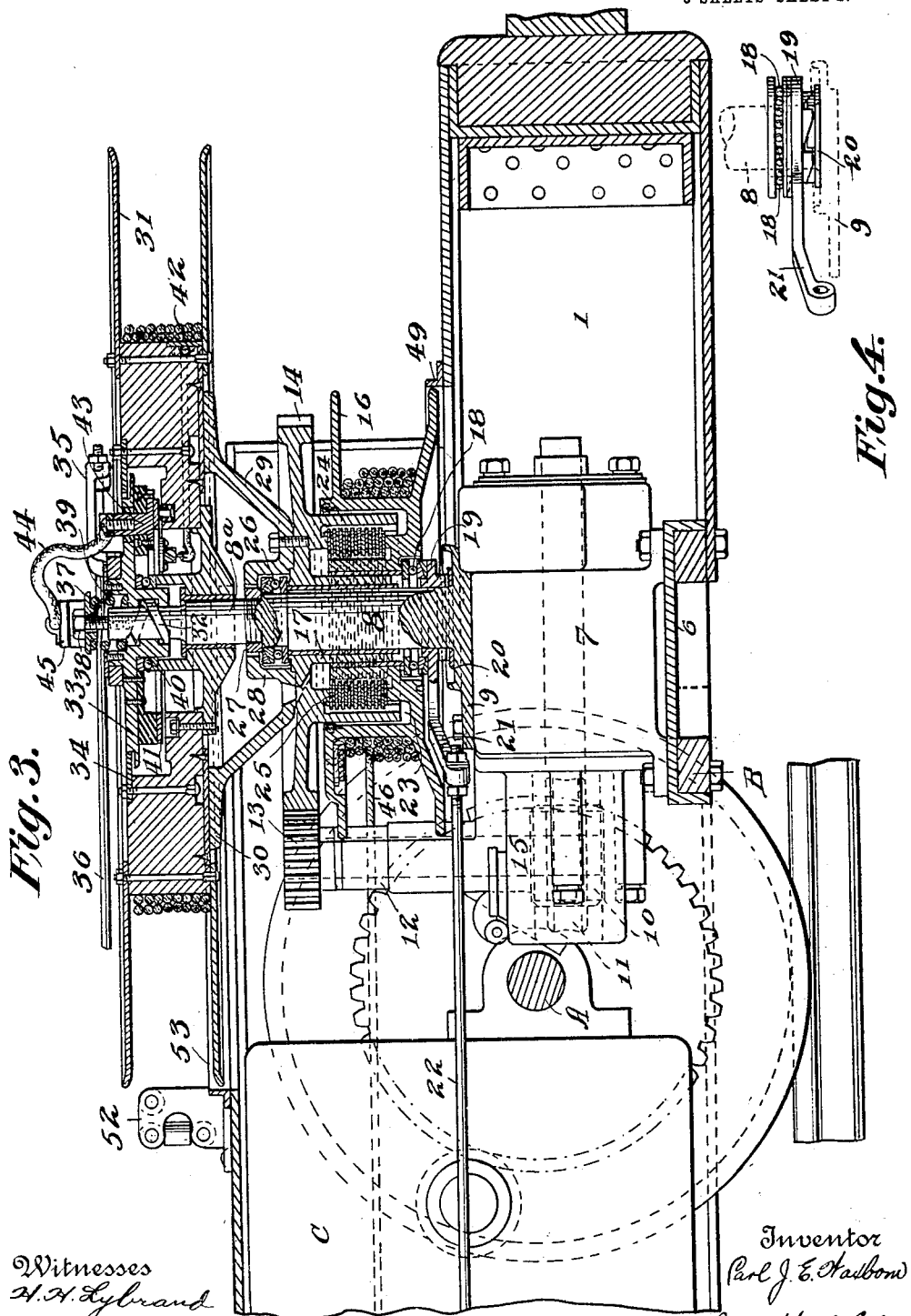
Witnesses
H. H. Lybrand
S. Jay Teller
Inventor
Carl J. E. Waxbom
By H. H. Bliss
Attorney C. J. E. WAXBOM.
ELECTRIC LOCOMOTIVE.
APPLICATION FILED JAN. 22, 1912. RENEWED APR. 28, 1914.
1,120,572.
Patented Dec. 8, 1914.
3 SHEETS—SHEET 3.
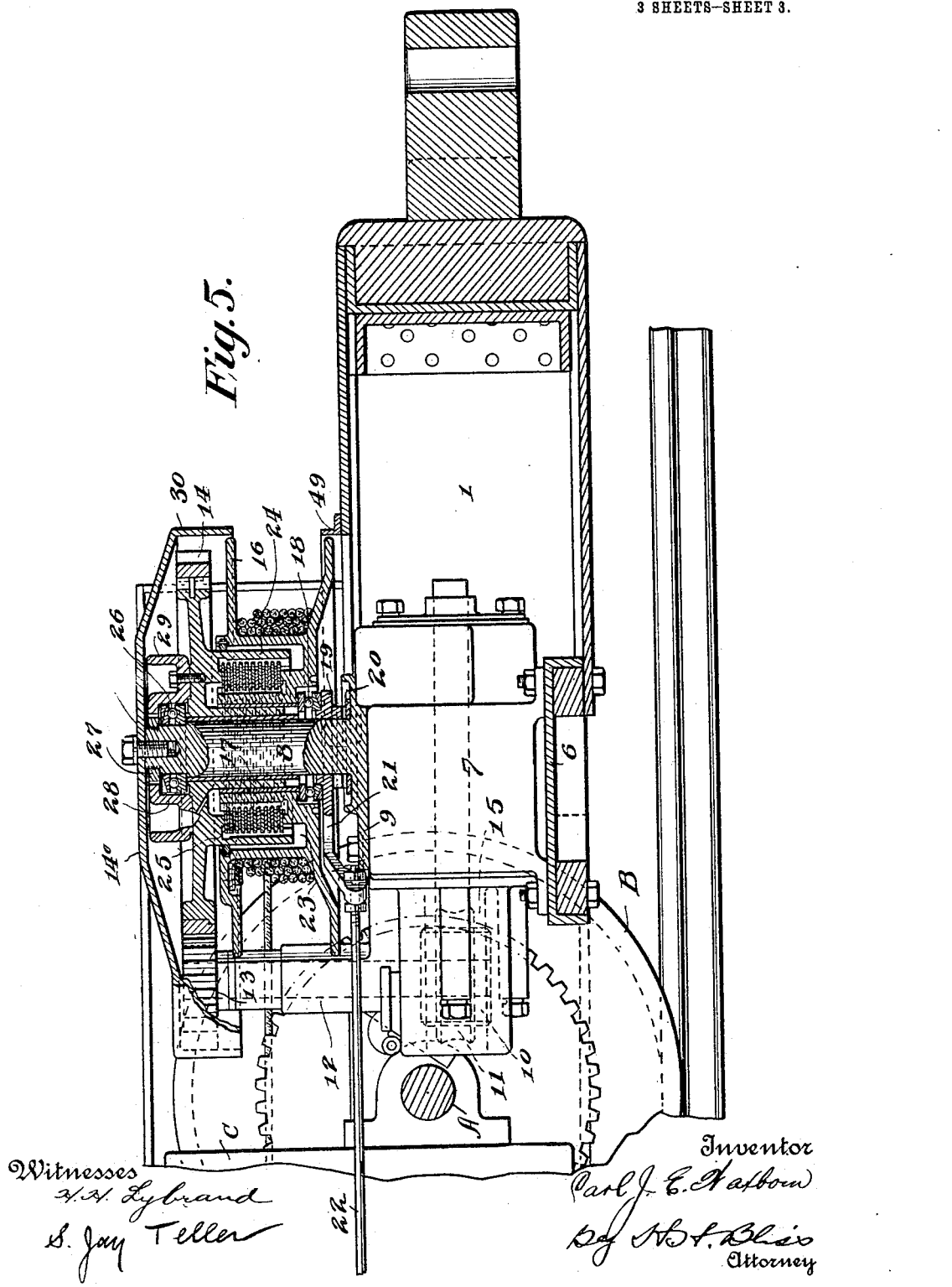

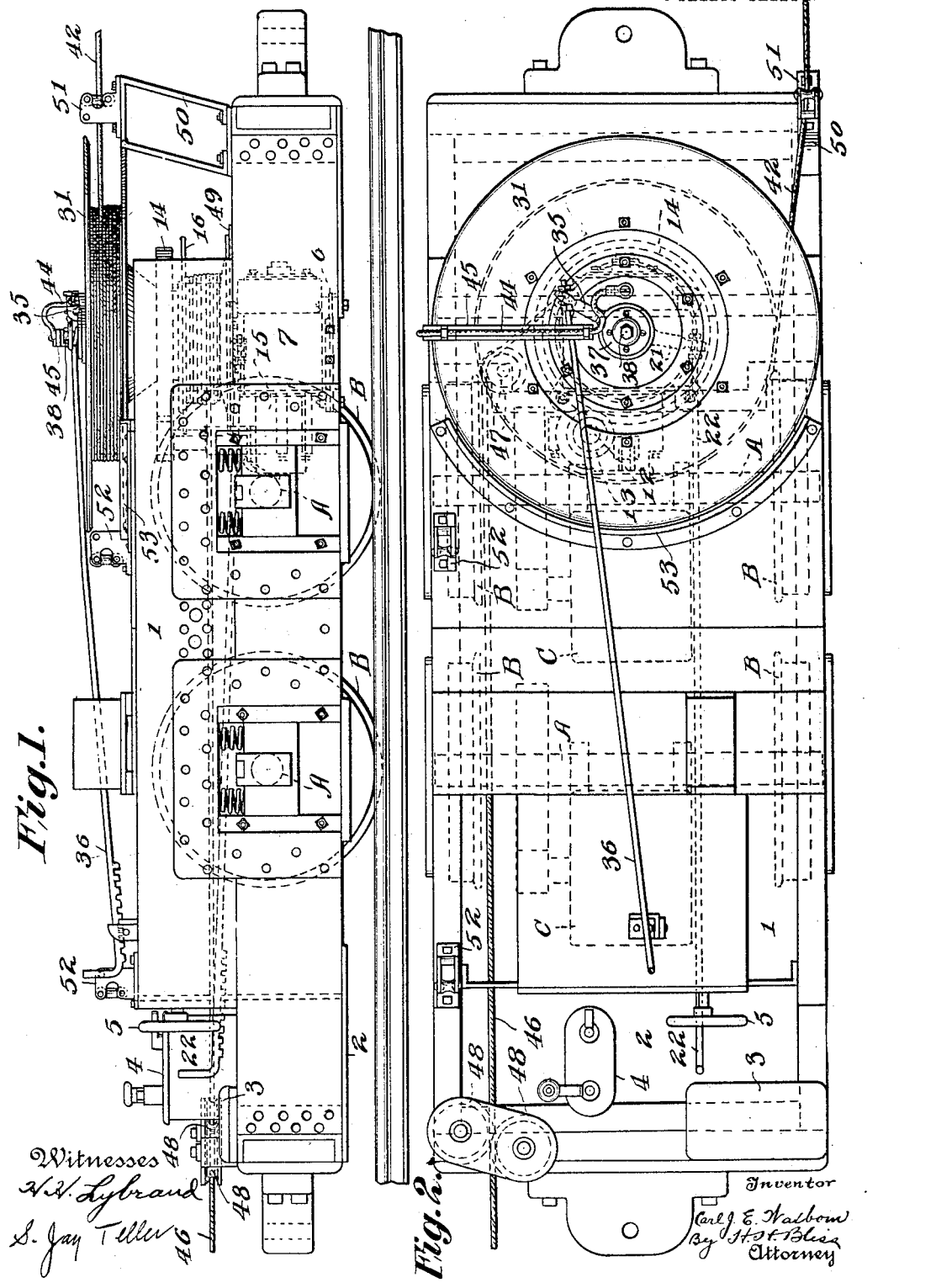

UNITED STATES PATENT OFFICE.

CARL J. E. WAXBOM, OF COLUMBUS, OHIO, ASSIGNOR TO THE JEFFREY MANUFACTURING COMPANY, A CORPORATION OF OHIO.

ELECTRIC LOCOMOTIVE.

1,120,572.　　　　Specification of Letters Patent.　　Patented Dec. 8, 1914.

Application filed January 22, 1912, Serial No. 672,550. Renewed April 28, 1914. Serial No. 835,045.

*To all whom it may concern:*

Be it known that I, CARL J. E. WAXBOM, a citizen of the United States, residing at Columbus, in the county of Franklin and State of Ohio, have invented certain new and useful Improvements in Electric Locomotives, of which the following is a specification, reference being had therein to the accompanying drawing.

This invention relates to electric locomotives and more especially to locomotives provided with winding mechanisms either for haulage cables or for both haulage and electric conductor cables. Locomotives provided with cables of one sort or the other are primarily adapted for use in and about mines and their functions and modes of operation are now well known.

When an electric conductor cable is provided it is used to supply current to the locomotive motors while the locomotive is operating on tracks in a mine side entry or room where the ordinary trolley wires are not provided. As the locomotive advances into or returns from a side entry or room the conductor cable is paid out or wound up either automatically or by means of manually controlled mechanism. In many cases because of low roofs or because of uneven or sharply inclined tracks it is impossible, or inadvisable, for the relatively heavy locomotive to be advanced into a room to be attached directly to a car. In these cases use is made of a haulage cable connected to a power driven reel on the locomotive. The free end of the cable is attached to the car in the room and by winding the cable onto the reel the car is hauled out to a point near the locomotive. It is frequently desirable to have a locomotive equipped with two reels, one for a haulage cable and the other for a conductor cable, and it is to locomotives so equipped that my present invention relates. Locomotives of this class may be advanced into a side entry for a considerable distance away from a trolley wire or other source of electric energy and cars may then be hauled to the locomotive from still more remote points along the entry or in rooms at the sides.

The objects of my invention are to provide a locomotive having the following features: an improved self-contained winding mechanism capable of being readily connected to or detached from the locomotive; an improved driving mechanism comprising an independent motor and power connections capable of being readily controlled to transmit power to either or both reels; improved means for controlling the rotation in the winding and unwinding direction of the electric cable reel; and an improved general arrangement of parts such that the driving motor and the haulage reel can be used without substantial modification, either separately or with a conductor cable reel.

Other objects will appear from the following specification.

Of the accompanying drawings which illustrate the form of my invention which I now deem preferable, Figure 1 is a side elevation of a locomotive having a reeling mechanism embodying my invention; Fig. 2 is a plan view of the locomotive shown in Fig. 1; Fig. 3 is a vertical cross sectional view through one end of the locomotive and through the cable winding mechanism; Fig. 4 is a detailed elevational view of the parts for controlling the haulage cable reel; Fig. 5 is a cross sectional view similar to Fig. 3 showing the locomotive arranged with only the haulage reel in place.

Referring to the drawings, 1 represents the main frame of the locomotive which, in the form shown, is made up of structural steel parts suitably connected together. The frame comprises side members and end members connected to the side members and provided with suitable couplers for the attachment of cars. The side members of the frame are provided with suitable bearing boxes for the axles A, A, which have secured to them the track wheels B, B. Motors C are suitably geared to the axles and serve to supply power for driving the locomotive. At one end of the locomotive there is provided a platform 2 and an operator's seat 3. At this end of the locomotive are provided the usual operating devices such as the controller 4 and the brake wheel 5. At the other end of the locomotive is located the cable winding mechanism which will be described in detail.

The cable winding mechanism is carried on a transverse bar 6 which extends between the side members of the locomotive frame. Secured to this bar near or at its center is an electric motor 7 which is arranged with its shaft extending longitudinally of the locomotive. Mounted upon the top of the frame of the motor 7 is a vertical stud or mast 8 which preferably has formed integrally with it a base flange 9. This base flange is bolted to the motor frame. Mounted on one end, preferably the forward end, of the shaft of the motor 7 is a worm 10. This worm 10 meshes with a worm wheel 11 which is secured to the vertical shaft 12. The shaft 12 carries at its upper end a pinion 13 which meshes with a gear wheel 14 rotatably mounted on the mast 8. A suitable frame and casing 15 is provided for inclosing and supporting the worm 10, the worm wheel 11 and the shaft 12. This frame and casing is either secured to or formed integrally with the frame of the motor 7. It will be noted that when the motor 7 is energized power will be transmitted to cause the constant rotation of the gear wheel 14.

16 represents the haulage cable reel. This reel is rotatably mounted and has a bearing on the depending hub 17 of the gear wheel 14. The reel is supported by means of the ball bearing 18, which in turn rests upon the ring 19.

As shown in Fig. 4, the ring 19 is provided with downward extending beveled teeth and these teeth are arranged to engage with similarly but oppositely beveled teeth on a stationary ring 20. The upper ring 19 is provided with an arm 21 which is connected with a link 22. The link 22 extends forward to a point within reach of the operator and means are provided for locking the link in adjusted position. By moving the link 22 the operator may oscillate the ring 19 and because of the engagement of the teeth of the two rings cause the reel 16 to rise or fall, as desired, for a purpose to be set forth.

The reel 16 is provided with an annular recess 23 into the outer part of which extends a drum-like flange 24, preferably formed as an integral part of the gear wheel 14. Suitable friction disks 25 are connected alternately with the flange 24 and the inner hub-like part of the reel 16 in such a way as to form a friction clutch of the well known disk type. When the link 22 is tensioned and the ring 19 is correspondingly moved the reel is made to rise sufficiently to cause close frictional contact between the disks and to cause, as a result, the transmission of power to the reel from the rotating gear wheel 14. When the link 22 is moved in the other direction the reel is permitted to fall and the clutch is released.

Above the gear wheel 14 is provided a ball bearing 26 which rests upon a shoulder on the mast 8 and which is held against upward movement by means of a nut 27. When upward pressure is applied to the gear wheel through the clutch the bearing 26 serves as an abutment to prevent upward movement. Secured to the upper side of the gear wheel 14 is a supporting frame 28 provided with an annular flange extending inward above the bearing. This frame 28, therefore, serves to support the gear wheel when there is no upward pressure through the clutch. The frame 28 is preferably provided around its periphery with an upstanding annular wall 29 which forms a reservoir for oil. By means of suitable passageways, such as are shown in the drawings, oil can be led from this reservoir to the clutch chamber.

The foregoing description is applicable either to the arrangement shown in Fig. 5 in which only a haulage cable reel is provided or to the arrangement shown in Figs. 1, 2 and 3 in which both haulage cable and electric conductor cable reels are provided. When no electric conductor reel is to be used a gear case 14$^a$ is provided for covering the gear 14 and the pinion 13. This gear case is preferably secured by means of a bolt to the top of the mast 8.

When an electric conductor cable reel 31 is to be used a mast 8 is provided having an extension 8$^a$ upon which the reel has a central bearing. A supporting frame 28 is provided, the peripheral wall 29 of which is inclined outward and provided at its upper edge with an annular horizontal flange 30 upon which the reel is frictionally supported.

The upper part of the mast extension 8$^a$ is provided with a sharply inclined thread 32 which engages with a similarly inclined groove in the hub of the plate or disk 33. Preferably the groove in the hub is somewhat wider than the thread, as shown in Fig. 3. The central part of the reel is provided with a recess for the reception of the disk 33 and its associated parts. An annular plate 34 is secured to the top of the reel around the periphery of the recess. This plate 34 extends inward sufficiently to permit engagement on its under side with the outer part of the disk 33. Secured to the disk 33 is an arm 35 which has connected to it a link 36. This link extends forward to a point within reach of the operator, means being provided for locking the link in adjusted position. The operator by moving the link 36 can oscillate the disk 33 and cause it to rise or fall because of its engagement with the thread 32. When the parts are moved to the position shown in Fig. 3, the disk 33 is preferably out of engagement with the plate 34 and the weight of the reel rests upon the friction surface of the flange 30 and in this way power is transmitted from the gear wheel 14 with which the flange 30 is connected. When the link 36 is tensioned and the disk 33 is made to rise the disk carries with it the reel 31 and lifts the reel out of engagement with the flange 30, therefore permitting it to come to rest.

A washer 37 is secured at the upper end of the mast 8ª by means of a stud 38. Between the washer 37 and the disk 33 there is interposed a stiff coil compression spring 39. The pressure exerted by the spring can be regulated by adjusting the bolt 38. Between the disk 33 and the reel frame there is interposed a ball bearing 40. As has already been pointed out, the groove in the hub of the disk 33 is wider than the thread 32 and, therefore, when the disk is moved to the position shown in Fig. 3 it is supported on the ball bearing 40 instead of on the thread. As soon as the disk becomes disengaged from the thread the spring 39 is permitted to act and to transmit its pressure through the ball bearing 40 to the reel. The spring in this way increases the pressure on the friction surface of the flange 30 and correspondingly increases the driving force which is transmitted to the reel. Obviously by adjusting the bolt 38 the pressure and the driving force may be regulated.

41 is a conductor ring rotatable with the reel and resiliently connected therewith. To this ring the inner end of the cable 42 is connected.

43 is a contact block mounted on the disk 33 but insulated therefrom. A suitable conductor 44 leads from the block 43 to the motor and other parts of the locomotive which are to be supplied with current. Preferably this conductor 44 is supported on an arm 45 which is secured to the frame of the locomotive and extends inward over the top of the reel.

A haulage cable 46 is secured to the reel 16 and may, if desired, be led off at the rear of the locomotive directly from the reel. It is usually preferable, however, to lead the cable forward to permit its being paid out or wound up at the forward end of the locomotive. In order to permit this an idler guide sheave 47 is provided near the reel and two other guide sheaves 48, 48 are provided at the forward end of the locomotive to make it possible for the cable to extend at an angle to the right or to the left. An upstanding arcuate flange 49 is provided adjacent the lower flange of the reel 16, this arcuate flange serving to prevent coils of the cable from working off from the reel and becoming fouled.

Means are preferably provided whereby the electric conductor cable can be paid out or taken up at either end of the locomotive. As shown in Figs. 1 and 2, the cable is being led off at the rear end. In order to make this possible an upstanding frame 50 is provided on which there is mounted a cable guiding device 51. Other similar cable guiding devices 52, 52 are provided which can be used when it is desired to pay out or take up the cable at the operator's end of the locomotive. An arcuate flange 53 is provided adjacent the lower flange of the reel to prevent coils of the cable from slipping off and becoming fouled.

From the foregoing description it is clear that I have provided a simple and compact reel mechanism driven by an independent motor. The motor may be continuously operated and simple means are provided whereby the operator can at will yieldably connect one or both reels with the motor. The amount of power transmitted to the haulage cable reel is within the control of the operator and as the power connection is a frictional one it is impossible for sufficient power to be transmitted to break the cable or unduly strain it. The power connection to the electric conductor cable reel is also frictional and an unduly large amount of power cannot be transmitted. It will be noted that so long as the motor 7 is energized and the flange 30 rotated a constant winding torque is applied to the reel. When the locomotive is moving toward the point of cable attachment this torque will be effective to cause winding. When the locomtive is moving in the other direction slippage will be caused and the reel will be made to rotate in the unwinding direction against the torque. It will be noted that it is also possible to lift the reel out of engagement with the flange 30 during unwinding and to permit resistance to unwinding being offered at the surfaces of contact of the disk 33 and the plate 34.

It will be noted that the same mechanism can, merely by the substitution of one mast for another and by the substitution of one frame 28 for another, be used either with or without a conductor cable reel. My invention makes it possible for a user having the construction as shown in Fig. 5 to easily add to it a conductor cable reel without the substantial modification of existing parts. This results in a considerable saving and is considered to be one of the important features of my invention.

I am aware that it has been heretofore proposed to provide a locomotive with two separate reels, one for a haulage cable and the other for an electric conductor cable. However, I believe myself to be the first to provide a reel driving motor independent of the locomotive driving motors and means whereby either or both of the reels can be operably connected with the reel motor.

What I claim is:

1. In an electric locomotive, the combination of a main frame, axles and track wheels for supporting the main frame, an electric motor for propelling the locomotive, a second motor supplemental to and operable independently of the locomotive propelling motor, a support for the second motor, a haulage cable reel mounted on and supported entirely by the frame of the said second motor and arranged for rotation about a vertical axis, a haulage cable connected to the said reel, a second electric conductor cable reel positioned above the haulage reel for rotation about a vertical axis co-incident with that of the haulage reel, the said second reel being also mounted upon and entirely supported by the motor frame, an electric conductor cable connected to the said second reel, and mechanism for transmitting power from the said second motor to both of the reels.

2. In an electric locomotive cable winding mechanism, the combination of an electric motor, a haulage cable reel mounted above the motor frame for rotation about a vertical axis, a haulage cable connected to the said reel, an electric conductor cable reel mounted above the haulage cable reel for rotation about a vertical axis coincident with that of the haulage cable reel, an electric conductor cable connected to the last said reel, a rotatable power element mounted between the two reels for rotation co-axially therewith, mechanism for transmitting power from the motor to the said power element, frictional power transmitting means between the power element and one reel, and frictional power transmitting means between the power element and the other reel.

3. In an electric locomotive cable winding mechanism, the combination of an electric motor, a haulage cable reel mounted above the motor frame for rotation about a vertical axis, a haulage cable connected to the said reel, an electric conductor cable reel mounted above the haulage cable reel for rotation about a vertical axis coincident with that of the haulage cable reel, an electric conductor cable connected to the last said reel, a rotatable power element mounted between the two reels for rotation co-axially therewith, mechanism for transmitting power from the motor to the said power element, power transmitting means comprising a manually controllable clutch between the said power element and one reel, and power transmitting means comprising a manually controllable clutch between the said power element and the other reel.

4. In an electric locomotive, the combination with a main frame, axles and track wheels for supporting the main frame and a motor for propelling the locomotive, of a cable reel mounted at one end of the locomotive for rotation about a vertical axis, a driving element mounted directly above the reel for rotation co-axially therewith, a manually controllable power connection between the driving element and the reel, power mechanism connected to the driving element and so arranged as not to obstruct the space vertically above it, and means whereby a second cable reel may be mounted in the said space and operatively connected to the said driving element.

5. In an electric locomotive, the combination with a main frame, axles and track wheels for supporting the main frame, and a motor for propelling the locomotive, of a supporting member extending transversely from one side to the other of the locomotive frame, an electric motor separate and distinct from the locomotive propelling motor mounted on the transversely extending supporting member near its center, a haulage cable reel mounted on and entirely supported by the frame of the separate motor for rotation about a vertical axis, a power connection between the motor and the reel, and means whereby an electric conductor cable reel may be removably mounted in the space above the haulage cable reel and operably connected with the separate motor.

6. In an electric locomotive cable winding mechanism, the combination of a power element rotatable about a vertical axis, a cable reel rotatable co-axially with the power element and normally supported thereby, and manually controllable means for causing relative vertical movement of the reel and the power element to bring them out of or into engagement.

7. In an electric locomotive cable winding mechanism, the combination of a power element rotatable about a vertical axis, a cable reel arranged to rotate co-axially with the power element and to be supported thereby, and manually controllable means for lifting the reel out of engagement with the power element.

8. In an electric locomotive cable winding mechanism, the combination of a power element rotatable about a vertical axis, a cable reel arranged to rotate co-axially with the power element and to be supported thereby, and manually controllable means for lifting the reel out of engagement with the power element, the said lifting means being adapted to permit the reel to rotate when elevated out of engagement with the power element.

9. In an electric locomotive cable winding mechanism, the combination of a power element rotatable about a vertical axis, a haulage cable reel mounted below the power element for rotation co-axially therewith, a manually controllable clutch between the power element and the haulage cable reel, an electric conductor cable reel supported on and frictionally engaged by the power element for rotation co-axially therewith, and manually controllable means for lifting the electric conductor cable reel out of engagement with the power element.

10. In an electric locomotive cable winding mechanism, the combination of a power element rotatable about a vertical axis, a haulage cable reel mounted below the power element for rotation co-axially therewith, a manually controllable clutch between the power element and the haulage cable reel, an electric conductor cable reel supported on and frictionally engaged by the power element for rotation co-axially therewith, and manually controllable means for lifting the electric conductor cable reel out of engagement with the power element, the said lifting means being adapted to permit the reel to rotate when in lifted position.

11. In an electric locomotive cable winding mechanism, the combination of a vertical mast, a power element rotatable on the mast, a haulage cable reel rotatable on the mast below the power element, a manually controllable clutch between the power element and the haulage cable reel, an electric conductor cable reel mounted on the mast above the power element and in frictional engagement therewith, and manually controllable means for lifting the electric conductor cable reel out of engagement with the power element.

12. In an electric locomotive cable winding mechanism, the combination of a vertical mast, a power element rotatable on the mast, a haulage cable reel rotatable on the mast below the power element, a manually controllable clutch between the power element and the haulage cable reel, an electric conductor cable reel mounted on the mast above the power element and in frictional engagement therewith, and manually controllable means for lifting the electric conductor cable reel out of engagement with the power element, the said lifting means being adapted to permit the reel to rotate when in lifted position.

13. In an electric locomotive cable winding mechanism, the combination of a vertical mast, a power element rotatable on the mast, an electric conductor cable reel rotatable on the mast above the power element and normally in frictional engagement with the power element, a disk having threaded engagement with the mast, means for oscillating the disk to move it vertically because of the said threaded engagement with the mast, and a connection between the disk and the reel whereby the latter is made to move vertically with the former.

14. In an electric locomotive cable winding mechanism, the combination of a vertical mast, a power element rotatable on the mast, an electric conductor cable reel rotatable on the mast above the power element and normally in frictional engagement with the power element, a disk having threaded engagement with the mast, means for oscillating the disk to move it vertically because of the said threaded engagement with the mast, and a connection between the disk and the reel whereby the latter is made to move vertically with the former, the connection being such that the reel may be rotated independently of the disk.

15. In an electric locomotive cable winding mechanism, the combination of a vertical mast, a power element rotatable on the mast, a haulage cable reel rotatable on the mast below the power element, a manually controllable clutch between the power element and the haulage cable reel, an electric conductor cable reel mounted on the mast above the power element and in frictional engagement therewith, a disk having threaded engagement with the mast, means for oscillating the disk to move it vertically because of the said threaded engagement with the mast, and a connection between the disk and the electric conductor cable reel whereby the latter is made to move vertically with the former.

16. In an electric locomotive cable winding mechanism, the combination of a vertical mast, a power element rotatable on the mast, a haulage cable reel rotatable on the mast below the power element, a manually controllable clutch between the power element and the haulage cable reel, an electric conductor cable reel mounted on the mast above the power element and in frictional engagement therewith, a disk having threaded engagement with the mast, means for oscillating the disk to move it vertically because of the said threaded engagement with the mast, and a connection between the disk and the electric conductor cable reel whereby the latter is made to move vertically with the former.

17. In an electric locomotive cable winding mechanism, the combination of a vertical mast, a power element rotatable on the mast, a cable reel rotatable on the mast above the power element, the said reel resting upon and having frictional engagement with the power element, and means connected with the mast for applying a downward force to the reel to increase the pressure between it and the power element beyond that resulting from the weight of the reel itself.

18. In an electric locomotive cable winding mechanism, the combination of a vertical mast, a power element rotatable on the mast, a cable reel rotatable on the mast above the power element, the said reel resting upon and having frictional engagement with the power element, and manually adjustable means connected with the mast for applying a downward force to the reel to increase the pressure between it and the power element beyond that resulting from the weight of the reel itself.

19. In an electric locomotive cable winding mechanism, the combination of a vertical mast, a power element rotatable on the mast, a cable reel rotatable on the mast above the power element, the said reel resting upon and having frictional engagement with the power element, and a spring having abutments against the mast and the reel and arranged to transmit downward force to the reel to increase the pressure between it and the power element beyond that resulting from the weight of the reel itself.

20. In an electric locomotive cable winding mechanism, the combination of a vertical mast, a power element rotatable on the mast, a cable reel rotatable on the mast above the power element, the said reel resting upon and having frictional engagement with the power element, a spring having abutments against the mast and the reel and arranged to transmit downward force to the reel to increase the pressure between it and the power element beyond that resulting from the weight of the reel itself, and means for adjusting the tension of the spring.

21. In an electric locomotive, the combination with the frame, the supporting wheels and the driving motor, of a vertical cable reel, a haulage cable on the reel having a tensile strength sufficient for the haulage of cars or for the movement of the locomotive itself, a second vertical reel removably mounted above the first reel, an insulated electric conductor cable on the second reel, centering means for the two reels adapted to leave the space above the lowest plane of the upper reel entirely unobstructed when the said reel is removed, and power means for driving either or both of the reels.

22. In an electric locomotive, the combination with the frame, the supporting wheels and the driving motor, of a vertical cable reel, a haulage cable on the reel having a tensile strength sufficient for the haulage of cars or for the movement of the locomotive itself, a second vertical reel removably mounted above the first reel, an insulated electric conductor cable on the second reel, centering means for the two reels adapted to leave the space above the lowest plane of the upper reel entirely unobstructed when the said reel is removed, a reel motor operable independently of the locomotive driving motor, and means supplemental to the said centering means for transmitting the power of the motor to either or both reels.

23. In an electric locomotive, the combination with the frame, the supporting wheels and the driving motor, of a vertical cable reel, a haulage cable on the reel having a tensile strength sufficient for the haulage of cars or for the movement of the locomotive itself, a second vertical reel removably mounted above the first, an insulated electric conductor cable on the second reel, central pivoting means for the reels, the upper part of which is removable when the upper reel is removed, and means supplemental to the pivoting means for driving either or both reels.

24. In an electric locomotive, the combination with the frame, the supporting wheels and the driving motor, of a vertical cable reel, a haulage cable on the reel having a tensile strength sufficient for the haulage of cars or for the movement of the locomotive itself, a second vertical reel removably mounted above the first, a conductor cable on the second reel, a removable vertical mast terminating near the top of the second reel and forming a pivot for both reels, a second shorter vertical mast adapted to be substituted for the first mast when the upper reel is removed and to form a pivot for the first reel only and to terminate near the top thereof, and means for driving either or both reels.

In testimony whereof I affix my signature, in presence of two witnesses.

CARL J. E. WAXBOM.

Witnesses:
  E. P. SNIVELY,
  DUDLEY T. FISHER.

Copies of this patent may be obtained for five cents each, by addressing the "Commissioner of Patents, Washington, D. C."